2 Sheets—Sheet 1.
C. J. DONNELLY.
MATCH MAKING MACHINE.
No. 11,589. Reissued Feb. 2, 1897.
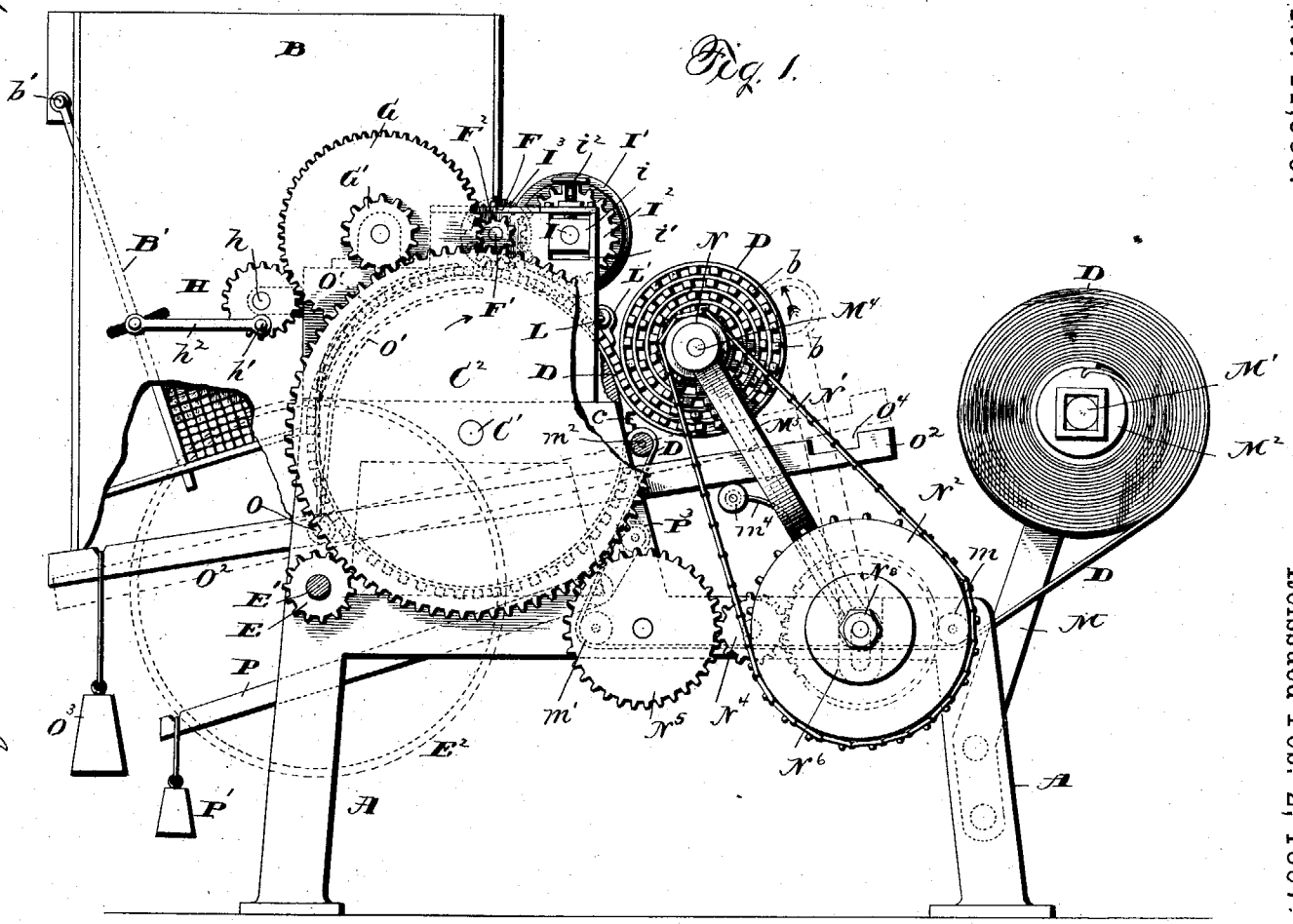
Witnesses
C. J. Williamson,
Henry C. Hazard.
Inventor
Charles J. Donnelly
by Pindle and Russell
his attorneys

C. J. DONNELLY.
MATCH MAKING MACHINE.
No. 11,589. Reissued Feb. 2, 1897.
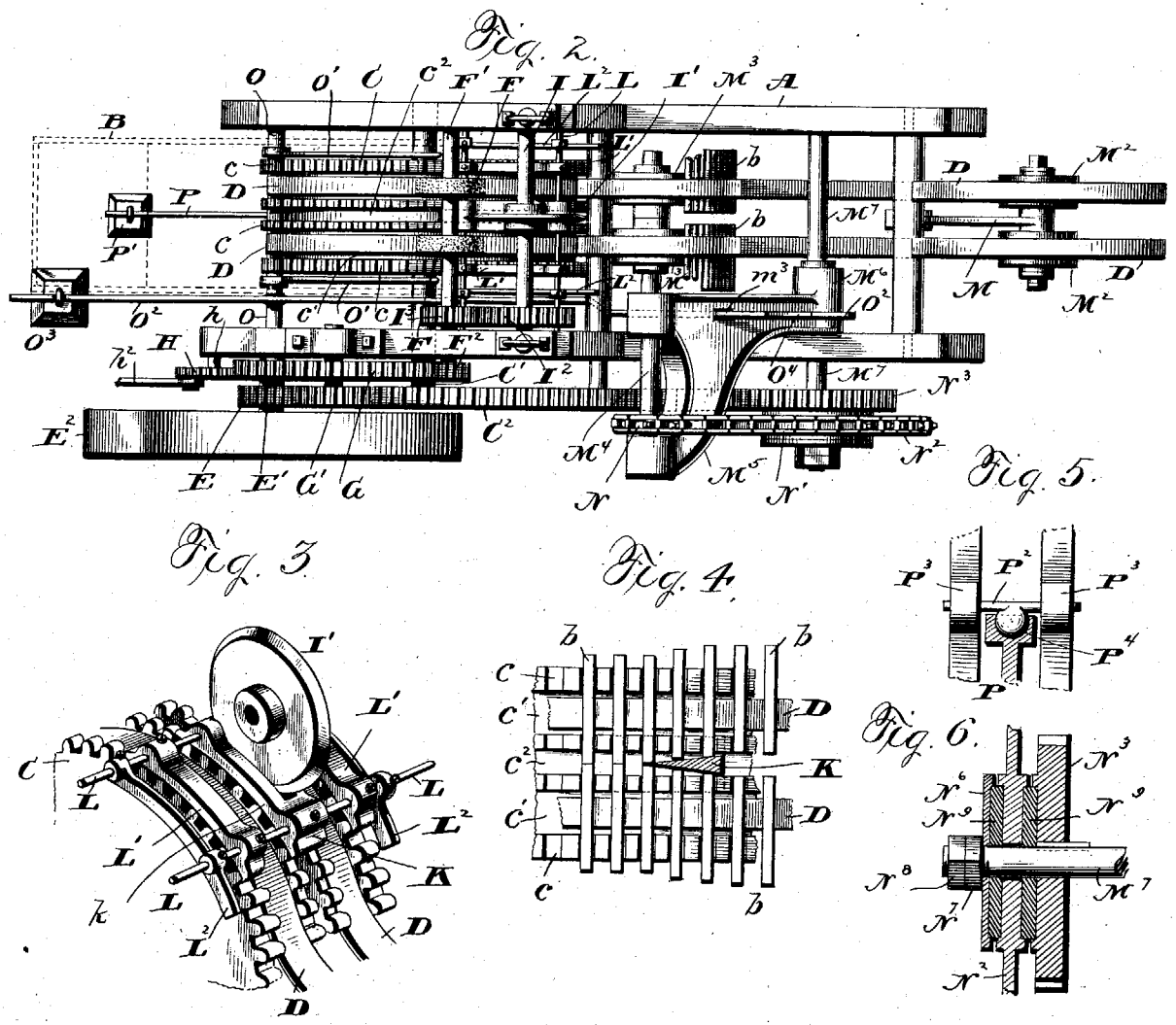
Witnesses
C. J. Williamson
Henry C. Hazard
Inventor
Charles J. Donnelly
by Brinkle and Russell
his attorneys

UNITED STATES PATENT OFFICE.

CHARLES J. DONNELLY, OF PHILADELPHIA, PENNSYLVANIA, ASSIGNOR TO THE DIAMOND MATCH COMPANY, OF ILLINOIS.

MATCH-MAKING MACHINE.

SPECIFICATION forming part of Reissued Letters Patent No. 11,589, dated February 2, 1897.

Original No. 450,405, dated April 14, 1891. Application for reissue filed March 23, 1893. Serial No. 467,387. Patented in England April 13, 1887, No. 5,390.

*To all whom it may concern:*

Be it known that I, CHARLES J. DONNELLY, of Philadelphia, in the county of Philadelphia, State of Pennsylvania, did invent certain new and useful Improvements in Match-Making Machines, (for which Letters Patent No. 450,405 were issued to me upon the 14th day of April, 1891, which Letters Patent have been found to be inoperative and invalid and not to cover fully the invention set forth in the specification and shown in the drawings which were filed by me in the Patent Office upon the 15th day of February, 1890, preparatory to the obtaining of the said Letters Patent.) Now, therefore, being desirous of reissuing the said Letters Patent, I have prepared and do hereby declare the following to be a full, clear, and exact description of the said improvements, reference being had to the accompanying drawings, in which—

Figure 1 shows a view of my machine in side elevation with a portion of the splint-holding hopper broken away; Fig. 2, a plan view of the machine; Fig. 3, a detail perspective view, on an enlarged scale, showing the means for cutting, separating, and guiding the splints to the tape-winding devices for coiling up the tapes with the divided splints thereon; Fig. 4, a detail view, on an enlarged scale, showing the feed-drum and the separator for separating the parts of the splints after the latter have been cut in two by the cutter; Fig. 5, a detail view showing the manner of supporting the tape-engaging rollers on the tension-lever; and Fig. 6, a detail sectional view showing the frictional connection between the sprocket-wheel, from which the tape spools or rolls are driven, and the gear-wheel for rotating such sprocket-wheel.

Letters of like name and kind refer to like parts in each of the figures.

The object of my invention has been to provide an improved machine for coiling match-splints up into bundles to prepare them for dipping; and to this end my invention consists in the machine and in the parts thereof constructed, arranged, and combined as hereinafter specified.

The application, Serial No. 340,653, upon which my United States Patent No. 450,405, now sought to be reissued, was granted was filed by me with the purpose of covering by United States patent the subject matter covered by British Patent No. 5,390 of 1887.

My invention, relating broadly to that class of machines employed in the manufacture of matches whereby the match-splints are automatically taken from a source of supply and fed to one or more tapes, with which they are coiled up into a bundle, so as to be held sufficiently separated from each other to enable the heads or tips to be readily applied to them by dipping without the danger of such heads becoming joined or stuck together, has to do particularly with means for feeding the splints to the tape or tapes with which they are to be coiled up and automatically stopping such feed by the action of the machine itself; with means for cutting the match-splints in two, separating the parts thereof, and coiling such parts up into separate bundles or bunches; with means for straightening out the splints in the hopper, so as to feed them properly to the feeding devices; with the means for securing equal tension on the two coiling tapes, and with the frictional connection between the driving-wheel and the tape-coiling devices to be driven therefrom, for the purpose to be hereinafter set forth.

In the drawings, A designates the frame of the machine, which can be of any desired form, construction, or material, and B designates the splint-holding hopper, supported thereon. Such hopper has a width equal to or slightly greater than the length of the splints *b b* to be operated upon, which, as shown, are long enough to make two matches when cut in two. Revolving partly in the inner or forward portion of this hopper is the feed-drum C, shorter than the match-splints, so that the latter will project beyond its opposite ends or sides, and having its periphery fluted or provided with longitudinal grooves *c c*, each large and deep enough to receive and hold one match-splint. Such drum has also two parallel circumferential grooves *c′ c′* on opposite sides of its central portion, made deeper than the grooves *c c*, so as to accommodate the two tapes D D below the bottoms of the latter grooves, for a purpose to be described, and a third circumferential groove $c^2$ midway between the other two.

The shaft C′ of the feed-drum has fixed on it a gear-wheel $C^2$, which meshes with and is driven by a pinion E on the driving-shaft E′, which, being journaled in suitable bearings in frame A, is provided with a band wheel or pulley $E^2$, by which it can be driven from any desired motor or source of power.

With the construction described above if the driving-shaft E′ be revolved to rotate the feed-drum in the direction indicated by the arrow in Fig. 1 splints from the hopper will fall into the longitudinal grooves *c c* in the drum and be carried forward thereby out of the hopper, being separated from each other a certain distance by the narrow portions of the drum periphery intervening between said grooves.

To keep back all splints not seated in the grooves *c c*, I provide at the outlet-opening of the hopper the rapidly-revolving brush wheels or rollers F F, which, being fixed on shaft E′, are rotated so that their lower portions nearest to the feed-drum travel backward into the hopper in the opposite direction to the travel of the drum periphery. These brush back into the hopper all splints that, not being seated in the splint-receiving grooves, would tend to be carried outward by contact with the drum periphery. Such clearing wheels or rollers are driven by a gear-wheel G, meshing with a pinion $F^2$ on shaft F′, and rigidly connected with a pinion G′, meshing with and driven by the gear $C^2$ on the drum-shaft C′.

The pinions $F^2$ and G′ are made so small with reference to the gear-wheels G and $C^2$, respectively, that the rotation of the brush wheels or rollers is quite rapid. Also meshing with and driven by gear G is a pinion H, which, being journaled on a stud *h* on the frame, has an eccentric wrist-pin *h*′, connected with a pitman $h^2$, so as to reciprocate the same. At its outer end this pitman is connected with the swinging piece B′, which, being hinged to the hopper at *b*′, engages the outer side of the collection of splints in the hopper and moves them up the upwardly and inwardly inclined bottom $B^2$ of the hopper toward the feed-drum each time that the pitman is drawn inward by its actuating-pinion and wrist-pin. The splints are thus given a series of rapidly-repeated blows or shocks, which, when the hopper-bottom is inclined upward toward the feed-drum, as shown, I have found to most effectually straighten out the splints and bring them into position parallel with each other, so that they will be most readily and certainly fed into the feed-drum grooves *c c*. Beyond the brush wheels or rollers F F, outside of the hopper B, is a shaft I, which at each end is journaled in a bearing-block *i*, supported in a slot *i*′, so as to be movable to and from the periphery of the feed-drum and made adjustable toward the drum by means of the adjusting-screw $i^2$. Such shaft carries a cutting-wheel I′, situated so that its edge comes centrally within the middle circumferential groove $c^2$ in the drum periphery, and has fixed upon it a gear-wheel $I^2$, meshing with and driven by a pinion $I^3$ on the shaft of the brush wheels or rollers F F. This cutting-wheel, supported and driven as described, serves to cut the splints in two as they are fed along by the holding-grooves *c c* in the feed-drum.

Just beyond the cutter, so as to engage the match-splints after they are cut in two, is the separator K, which consists, essentially, of a wedge-shaped piece having its apex situated in line with the cutter, so as to enter between the inner ends of the cut parts of the splints and move them longitudinally outward in the splint-holding grooves of the drum as they are carried along in contact with the inclined sides of said piece by the continued motion of the drum. While such separator can be supported in any desired way without departure from my invention, I prefer to support it, as shown in the drawings, from the cross rods or bars L L, which at their opposite ends can be secured to the sides of the frame. Also supported upon these rods or bars are the strips L′ L′, which, extending over a portion of the periphery of the feed-drum, serve to retain the splints in the grooves *c c* while they are being cut and acted upon by the separator and the side guides $L^2$ $L^2$, which serve to limit the longitudinal outward movement of the parts of the cut splints and guide the outer ends thereof when the separator has performed its work in the manner described. There are at the sides of the wedge-piece forming the separator overhanging portions *k k*, which also overlap the inner ends of the divided parts of the splints lying in the drum-grooves.

An arm M, supported on the outer or farther end of the frame A, carries a shaft M′, bearing the two spools or bobbins $M^2$ $M^2$, which have wound upon them the tapes or bands of webbing D D, which I shall call the "tapes," though they can be formed of strips of any suitable flexible material. From these spools the tapes run inward under the guide-rollers *m m*′, and thence up to and over rollers $m^2$ $m^2$, close to the periphery of the feed-drum at a point well beyond the separator hereinbefore described. From rollers $m^2$ they run in the two circumferential grooves *c*′ *c*′ down under and then up over the drum, as shown, and have their farther ends just beyond the described separator attached to rotary pieces or spools $M^3$ $M^3$, placed on and connected with the spindle $M^4$, so as to rotate with the same. This spindle is journaled on a swinging arm $M^5$, which has at its lower end a sleeve or hub $M^6$, journaled upon a shaft $M^7$, so that the spindle-carrying end of the arm can swing toward and from a point on the feed-drum C, which is just below the match-splint cutting and separating devices. With this construction as the feed-drum is rotated and the spindle $M^4$ is revolved in the direction indicated by the arrow the divided halves of the splints will be taken from the feed-drum by the respective tapes and coiled up with the latter upon the respective winding devices $M^3$ $M^3$.

For rotating the spindle I provide the latter with a sprocket-wheel N, driven by a sprocket-chain N′, engaging sprocket-wheel $N^2$, journaled on the shaft $M^7$, about which the arm $M^5$ swings, and employ connecting-gearing for driving the latter wheel from the gear-wheel $C^2$ on the feed-drum shaft. As the rate of travel of such drum and the feed of the splints is uniform, while with a given speed of the spindle $M^4$ the travel of the outer periphery of each coil of tape and splints on the spindle would increase as the diameter of the coil grows greater, I provide means for allowing slip between the driving power and the spindle, so that the latter, with the tape-coiling spools or bobbins thereon, will be rotated only fast enough to coil up the tapes with splints thereon as delivered by the feed-drum, and the tapes will not be subjected to undue strain. For this purpose the sprocket-wheel $N^2$ is journaled loosely on shaft $M^7$, upon which the gear-wheel $N^3$, connected with gear-wheel $C^2$ by intervening gears $N^4$ and $N^5$, is splined.

On the side of the sprocket-wheel $N^2$, away from the gear $N^3$, is a washer or dish-shaped piece $N^6$, which, on its outer side, is engaged by a nut $N^7$ on the shaft end, which can be locked as adjusted by jam-nut $N^8$. Between washer $N^6$ and the sprocket-wheel and between the latter and the gear-wheel $N^3$ are the friction-disks $N^9$ $N^9$, of leather, which form the driving connection between the sprocket-wheel $N^2$ and the gear $N^3$, adapted to transmit the rotating power from said gear frictionally, the amount of friction being increased or diminished by turning the nut $N^7$ to cause the friction-disks $N^9$ $N^9$ to be clamped more or less firmly against the side of the sprocket-wheel and between the latter and the power-driven wheel $N^3$.

In order to automatically stop the feed of the match-splints from the hopper when a sufficient quantity of splints have been coiled up with the tapes, I attach to the rock-shaft O, suitably journaled on the frame A, the two curved arms O′ O′, which, being situated just beyond and close to the ends or sides of the feed-drum, extend upward and forward from the rock-shaft into the hopper B, and are so shaped that they can, by the motion of the shaft, be caused to stand below or rise up above the match-splint-receiving grooves *c c* in the feed-drum, so as to leave the splints free to drop into such grooves or raise them up and keep them out of the latter, so that although the rotation of the drum continues no more splints will be fed out by the same until the stop-arms are depressed again. As such arms are situated and move close to the ends or sides of the feed-drum they are in position to engage the opposite ends of the match-splints, which, as indicated hereinbefore, are long enough to project beyond the sides of the drum. Also attached to rock-shaft O is the lever $O^2$, for actuating the latter to move the stop-arms into and out of feed-stopping position, having its arm extending out toward the hopper end of the machine, provided with the weight $O^3$, and its other arm carried forward through a slot $m^3$ in the swinging spindle-carrying arm $M^5$. This slot is so arranged that its upper end will, by engaging the upper side of the lever $O^2$, keep it depressed to hold the feed-stop arms O′ O′ down out of operative position, so as to leave the splints free to drop into the feed-drum grooves *c c*. A spring-arm $m^4$, on the swinging arm $M^5$, bears against the under side of the lever and presses upon the latter in a direction to raise the same and cause the stop-feed arms O′ O′ to be elevated into operative position when the said lever is released. To secure this release after the swinging arm $M^5$ has been moved a certain distance away from the feed-drum by increase in the size of the coils of tapes and match-splints on the winding device carried on the arm's upper end, the lever $O^2$ is notched in its upper side at $O^4$. When the arm $M^5$ with its lever-engaging slot has moved to carry the upper end of its slot off of the raised part of the upper edge of the lever and over the notch $O^4$, the lever is left free to rise and is quickly thrown up to cause the arms O′ O′ to stop the feed from the hopper at once in the manner hereinbefore described. Another weighted lever P, having its outer end provided with weight P′, has on its other end a short shaft $P^2$, carrying the two tension-rollers $P^3$ $P^3$ for engaging the respective tapes D D, connected with the lever by a ball-and-socket joint $P^4$, adapted to allow said roller-carrying shaft to rock and adjust itself to compensate for any variation in the length of the tapes. The result of such construction is that the tapes will be kept under equal tension, notwithstanding any slight difference in feed of the same from their respective supply spools or bobbins.

Instead of having the sprocket-wheel $N^2$, gear-wheel $N^3$, and the washer $N^6$ mounted on the shaft $M^7$, I contemplate mounting them with the intervening friction-disks $N^9$ $N^9$ on a stud which can be adjustably secured in a vertically-slotted plate or bearing. (Indicated in dotted lines in Fig. 1.) With this construction the sprocket-wheel $N^2$ may be adjusted to keep the sprocket-chain sufficiently taut to operate properly with the two sprocket-wheels over which it runs.

If it should be desired to use the machine for coiling up match-splints without cutting them, the cutter and separator can be dispensed with. A single web or tape can then be employed instead of the two shown in the drawings, or where the splints are of full length for two matches both the tapes or webs may be used.

The operation of my apparatus, as shown and described, which will be fully understood from the foregoing description and the drawings, is briefly as follows: With the hopper supplied with splints, the tapes being led from their supply bobbins or spools over the described guide-rolls and around the feed-drum in the circumferential grooves $c'$ $c'$ therein to the winding or coiling-up devices on the spindle $M^4$ on the upper end of the swinging arm $M^5$ and such arm swung toward the feed-drum to hold the lever for actuating the feed-stop arms down, so that such arms will be out of position to stop the feed and will leave the match-splint-receiving grooves $c$ $c$ free to receive splints from the hopper if power be applied to wheel $E^2$ on driving-shaft $E'$ to rotate the same, the splints, being jarred and shaken by the swinging piece $B'$ up the inclined bottom of the hopper toward the feed-drum, arrange themselves so as to drop into and fill the grooves $c$ $c$ in the drum as the periphery of the latter is carried forward through the hopper. Any splints not seated in such grooves are prevented from passing out of the hopper above the feed-drum by the rapidly rearward-revolving brush-wheels F F, which force them back into the hopper, clearing off the upper surface of the drum as it passes through the hopper-front. After leaving the brush-wheels the splints are, by the continued rotation of the drum, carried under the strips $L'$ $L'$, which serve to hold them down in their grooves $c$ $c$, and are then passed under the revolving cutter-wheel $I'$, which cuts them in two centrally. Being carried farther by the motion of the drum, they immediately upon being cut are engaged by the separator, whose wedge-shaped piece, with its inclined sides engaging the inner ends of the halves of the divided splints, force the latter apart in the manner shown and described at length hereinbefore. After leaving the separator the divided splints, being fed onward with the two tapes, which are situated in the circumferential grooves $c'$ $c'$ below the splint-holding grooves, pass from the feed-drum upon said tapes to the winding or coiling-up devices on the swinging arm $M^5$, by which the tapes, with the splints thereon, are rolled up into coils or spiral bundles, as shown. As these coils or bundles increase in size, so that their outer peripheries would travel faster, or a farther distance, for a certain amount of rotation of the spindle $M^4$, the friction connections between the sprocket-wheel $N^2$ and the rotating gear-wheel $N^3$ for driving the same allow slip between the wheel and gear, so that the rate of rotation of the spindle $M^4$ can be slower and slower as the coils or bundles of tapes and splints increase in size. With this construction the tapes with the splints thereon will be taken from the feed-drum and rolled up without undue tension or danger of breaking, the measure of the power applied to the spindle from the gear-wheel $N^3$ being always measured by the amount of friction of the described frictional connections between such gear and the sprocket-wheel $N^2$, which friction can be adjusted as desired by turning the nut $N^7$ to regulate the closeness with which friction-disks $N^9$ $N^9$ are clamped. As the coils or bundles of splints and tapes on the winding devices on the upper end of arm $M^5$ increase in diameter, said arm is swung farther and farther back, away from the feed-drum, until, as indicated by dotted lines in Fig. 1, the upper end of the slot $m^3$ rides off of the raised part of the upper side of the lever and comes over the notch $O^4$ in the latter. Such lever, being pressed upward by the spring-arm $m^4$ on the swinging arm $M^5$, then is free to fly upward, which it does quickly, turning the rock-shaft O to lift the feed-stop arms $O'$ $O'$ on the latter up into position to stop the feed from the hopper by raising the splints in the latter out of the grooves $c$ $c$ of the feed-drum and keeping them from getting into the same again until said arms are depressed for a new bundling operation.

The size of the bundles or coils, which will be rolled up before the feed of the splints is stopped in the manner described, will of course depend upon the position of the notch $O^4$ in the lever or the travel of the swinging arm $M^5$, which is necessary to release the lever.

After the stopping of the feed in the manner above described the coiled bundles of match-splints and tapes can be removed from the spindle, and the tapes being severed beyond the bundles their ends may be attached to other similar spools or coiling devices placed upon the spindle $M^4$. The coiling or bundling operation can then be started again by simply depressing the lever $O^2$ to depress the stop-arms $O'$ $O'$ out of operative position and swinging the arm $M^5$ over toward the feed-drum again into its position first described.

During the operation of the machine to coil up the splints with the tapes in the manner shown and described the tension-rollers $P^3$ $P^3$, carried by the weighted lever P, will be pressed upon the two tapes where they pass between guide-rollers $m^2$ $m^2$, so as to keep such tapes under tension, and in case there should be any inequality in or difference in feed of the tapes from their respective spools or bobbins the ball-and-socket connection between the lever and the shaft $P^2$, on which such tension-rollers are journaled, allows rocking of such shaft, so that the inequality or difference in the tapes is compensated for, and both tapes are put under equal tension.

Having thus described my invention, what I claim is—

1. In a machine for bundling match-splints, in combination with a hopper for the splints, a feeding-carrier having its surface moving in the hopper, provided with splint-receiving recesses, a coiling tape receiving the splints fed from the hopper, a rotary device to coil the tape with the splints thereon, one or more movable stop-arms normally below such recessed surface, and adapted when raised, to

BEST AVAILABLE COPY keep the splints in the hopper from the recesses of the feeding-carrier, automatic means for raising such arm or arms into feed-stopping position, and automatic means for holding the arm or arms down, until a certain point in the operation of the machine, substantially as and for the purpose described.

2. In a machine for bundling match-splints, in combination with a hopper for the splints, and a feeding-carrier having its surface moving in the hopper provided with splint-receiving recesses, a coiling tape to receive the splints fed from the hopper, a rotary device to coil the tape with the splints thereon, one or more movable stop-arms to move and keep the splints out of such recesses, yielding means tending to hold such arm or arms in raised feed-stopping position, and automatic means for holding the arm or arms normally down out of such position, and releasing them after the machine has acted for a time, substantially as and for the purpose described.

3. In a machine for bundling match-splints, in combination with the hopper for the splints, and a feeding-carrier having its surface moving in the hopper provided with splint-receiving recesses, a coiling tape to receive the splints fed from the hopper, a rotary device to coil the tape with the splints thereon, one or more movable stop-arms, for lifting and holding the splints in the hopper out of such recesses, yielding means tending to hold such arm or arms raised into feed-stopping position, a lever connected rigidly with the stop arm or arms, automatic means for holding such lever, so as to keep the stop arm or arms normally down out of operative position, until a certain predetermined point in the operation of the machine is reached, and then releasing it, substantially as and for the purpose described.

4. In a machine for bundling match-splints, in combination with a hopper for the splints, and a feeding-carrier with recessed splint-receiving surface moving into and out of the hopper, made narrower than the splints are long, the feed-stop device consisting of two arms situated on opposite sides of the feeding-carrier, and connected with actuating means, by which they can be raised, to engage the ends of the splints projecting beyond the sides of the feeding-carrier, and lift the splints in the hopper out of the feeding-carrier recesses, substantially as and for the purpose described.

5. In a machine for bundling match-splints, in combination with a hopper for the splints, a rotary drum narrower than the splints are long, having its periphery provided with recesses to take the splints from the hopper, the feed-stop device consisting of two arms situated on opposite sides of the drum, normally below the plane of the bottoms of the recesses of the drum, but adapted, when raised, to engage the ends of the splints projecting beyond the sides of the drum, and raise such splints in the hopper out of the drum-recesses, and means for raising such arms, substantially as and for the purpose described.

6. In a machine for bundling match-splints, in combination with a hopper for the splints, the rotary drum provided with recesses in its periphery, to take the splints from the hopper, a coiling tape, a swinging arm, a rotary tape-coiling device on the latter, an automatic stop-feed device to raise and hold the splints in the hopper out of the recesses of the drum, and connections between such device and the swinging arm carrying the rotary tape-coiling device, whereby the feed-stop device will be held in inoperative position, until such swinging arm has moved a certain distance, substantially as and for the purpose described.

7. In a machine for bundling match-splints, in combination with the hopper for the splints and the notched or recessed drum fed from said hopper, a coiling tape, a swinging arm, a rotary tape-coiling device on the latter, a weighted lever provided with a notch passing beyond and into position to be engaged by a portion of the arm carrying the coiling device, and means for raising the splints in the hopper away from the recesses of the drum, connected with the weighted lever, substantially as and for the purpose described.

8. In a machine for bundling match-splints, in combination with a hopper for the splints, a drum with recessed periphery to take the splints from the hopper, a coiling tape, a swinging arm, a rotary tape-coiling device on the latter, a weighted lever with notched end, passing through a slot in the swinging arm, and means connected with such lever to prevent the splints from entering the recesses of the drum, substantially as and for the purpose described.

9. In a match-splint-bundling machine, in combination with the hopper, the feed-drum having its periphery provided with longitudinal grooves to receive the match-splints, and with one or more circumferential grooves, one or more tapes running partly around the drum in the circumferential groove or grooves thereof, a swinging arm movable toward and from the drum, means carried on such arm for coiling up the tape or tapes, an automatic stop device to prevent the splints getting into the longitudinal grooves in the drum, and connections between such device and the swinging arm, whereby the stop device is held out of operation, until the arm has swung a certain distance from the feed-drum, and is then thrown into operation to stop the feed, substantially as and for the purpose described.

10. In a match-splint-bundling machine, in combination with the hopper for the splints, a feeding device having match-splint-receiving recesses, two parallel tapes receiving the splints from the feeding device, a winding device to coil up the tapes and the splints thereon, a cutter and a separator between the feeding and the winding devices, substantially as and for the purpose described.

11. In a match-splint-bundling machine, in combination with a hopper for the splints, a feeding device having match-splint-receiving recesses, the two tapes receiving the splints from the feeding device, a winding device to coil up the tapes and the splints thereon, a cutter between the feeding and coiling devices, a separator between the cutter and the coiling device, and guides to guide the outer ends of the two parts of the cut splints, as they are separated by the separator, substantially as and for the purpose described.

12. In a match-splint-bundling machine, in combination with a hopper, a rotary drum with longitudinal and circumferential grooves in its periphery, the two tapes passing partly around the drum, in the circumferential grooves thereof, a winding device for coiling up such tapes, a cutter between the tapes and between the drum and winding device, and a separator between the latter and the cutter, to engage the inner ends of the cut parts of the splints, and move them apart, substantially as and for the purpose described.

13. In a match-splint-bundling machine, in combination with the hopper for the splints, the drum with the longitudinal and circumferential grooves in its periphery, the two tapes passing partly around the drum, in the circumferential grooves thereof, a winding device for coiling up the tapes after they leave the drum, a cutter to cut the splints in two, while in the longitudinal grooves of the drum, a separator to engage the inner ends of the cut parts and separate them longitudinally, guides to guide the outer ends of the separated parts of the splints, and means for holding the splints down in the drum grooves or recesses, while they are being cut and separated, substantially as and for the purpose described.

14. In a match-splint-bundling machine, in combination with the two tapes for coiling up the splints, a tension device for the same consisting of a weighted lever, the two tension-rollers each engaging one of the tapes, and a rocking support for such rollers on the lever, substantially as and for the purpose described.

15. In a match-splint-bundling machine, in combination with the hopper having an inclined bottom, the swinging end piece to move the splints inward up such bottom, the feed-drum with its splint-receiving grooves, one or more brush-wheels at the outlet to the hopper, one or more coiling tapes receiving the splints from the drum, means for raising the splints in the hopper away from the feed-drum grooves to stop the feed, substantially as and for the purpose described.

16. In a match-splint-bundling machine, in combination with the swinging arm having its lower end mounted on a shaft, and its upper end provided with a spindle carrying one or more spools, a sprocket-wheel fixed on the spindle, a second sprocket-wheel journaled on the shaft, the sprocket-chain, the wheel for driving the second sprocket-wheel, connected with the shaft, so as to turn therewith, friction-disks on opposite sides of the latter sprocket-wheel, a clamping-washer engaging the outer friction-disk, and a nut on the shaft engaging the outer side of the washer, substantially as and for the purpose described.

In testimony whereof I hereunto set my hand this 16th day of March, A. D. 1893.

CHARLES J. DONNELLY.

Witnesses:

FRANK H. MASSEY,

MAURICE R. MASSEY.